United States Patent [19]

Endo

[11] Patent Number: 5,214,773
[45] Date of Patent: May 25, 1993

[54] FUZZY TEMPORAL CONTROL METHOD

[75] Inventor: Tsunekazu Endo, Yokohama, Japan

[73] Assignee: Kabushiki Kaisha Toshiba, Kawasaki, Japan

[21] Appl. No.: 562,563

[22] Filed: Aug. 1, 1990

[30] Foreign Application Priority Data

Aug. 3, 1989 [JP] Japan ................................. 1-202165

[51] Int. Cl.$^5$ ............................................. G06F 15/00
[52] U.S. Cl. ...................................... 395/61; 395/900; 395/903
[58] Field of Search ................... 395/10, 3, 61, 900, 395/903

[56] References Cited

U.S. PATENT DOCUMENTS

| | | | |
|---|---|---|---|
| 4,958,288 | 9/1990 | Takahashi et al. | 395/900 |
| 4,976,377 | 12/1990 | Higuchi et al. | 395/900 |
| 5,047,701 | 9/1991 | Takarada et al. | 395/900 |
| 5,050,083 | 9/1991 | Uchida et al. | 395/900 |
| 5,060,157 | 10/1991 | Tado et al. | 395/900 |

OTHER PUBLICATIONS

Processing Fuzzy Temporal Knowledge; Dubois et al; IEEE Transactions On Systems, Man, & Cybernetics; vol. 19, No. 4; Jul./Aug. 1989; pp. 729-744.
An Event Based Fuzzy Temporal Logic; Dutta; Proc. 18th Inter. Sym. On Multiple Valued Logic; May 1988; pp. 64-71.
Applications Of Fuzzy Mathematics In Earthquake Prediction; Feng et al; J. Phys. Earth, 34, Suppl., S213–S221, 1986.
"Application of Fuzzy Algorithm For Control of Simple Dynamic Plant"; E. H. Mamani, Proc. IEE, vol. 121, No. 12, 1585-1588.

Primary Examiner—Allen R. MacDonald
Attorney, Agent, or Firm—Banner, Birch, McKie & Beckett

[57] ABSTRACT

A fuzzy control method of a controlled object uses control rules, having a condition part, each condition part having both a first proposition characterized by a membership function whose variable is a time and a second proposition with respect to the state of the controlled object. According to the method, inputting information with respect to the state of the controlled object is input to a fuzzy control execution circuit. The degree of confidence of the first proposition characterized by the membership function is calculated according to the information for each of the control rules by using a particular equation. Then, the degree of confidence of the satisfaction of a condition part of each of the control rules is calculated according to the degree of confidence of each first proposition. A suitable control rule is obtained according to the degree of confidence of the satisfaction of each condition part so as to control the controlled object according to the control rule.

8 Claims, 4 Drawing Sheets

$$g(T(\theta_i=A)) = \max_{t=0..t_{max}} (\min(f_T(t), f_A(\theta_i(t_c-t))))$$

$$g(T(\theta_i=A)) = \sum_{t=0..t_{max}} (\min(f_T(t), f_A(\theta_i(t_c-t)))) / \sum_{t=0..t_{max}} f_T(t)$$

FUZZY TEMPORAL CONTROL METHOD

FIELD OF THE INVENTION AND RELATED ART STATEMENT

The present invention relates to a fuzzy control method for controlling a plant or a robot, for example. Thus far, a fuzzy control method for executing the control of a controlled object in accordance with control rules where the knowledge of an experienced operator is represented by fuzzy algorithms has been known.

The fuzzy control method can be effectively applied when the dynamic characteristics of the controlled object are not satisfactorily obtained or when the dynamic characteristics of the controlled object vary during its operation.

In the fuzzy control method, information with respect to the state of the controlled object is input and then a subsequent command to be output to the controlled object is determined in accordance with the aforementioned control rules.

However, generally, in the control rules used in the conventional control method, the states of the controlled object are evaluated only at definite times. Thus, fuzzy control that satisfactorily accords with the knowledge of an experienced operator is difficult to execute using the conventional fuzzy control method.

OBJECT AND SUMMARY OF THE INVENTION

An object of the present invention is to provide a fuzzy control method for executing a fuzzy control which satisfactorily accords with the knowledge of an experienced operator.

To accomplish the aforementioned objects, the fuzzy control method of the present invention uses control rules, each control rule having both a first proposition characterized by a membership function whose variable is a time and a second proposition with respect to the state of the controlled object, this method comprising the steps of: (a) inputting information with respect to the state of the controlled object, (b) calculating the degree of confidence of the first proposition characterized by the membership function according to the information for each of the control rules by using a particular equation, (c) calculating the degree of confidence of the satisfaction of a condition part of each of the control rules according to the degree of confidence of each first proposition, and (d) obtaining a suitable control rule according to the degree of confidence of the satisfaction of each condition part so as to control the controlled object according to the control rule.

Thus, according to the present invention, the states of a controlled object can be evaluated with respect to indefinite times and indefinite elapsed times. Consequently, the fuzzy control which satisfactorily accords with the knowledge of an experienced operator is accomplished.

DETAILED DESCRIPTION OF PREFERRED EMBODIMENT

By referring to the accompanying drawings, an embodiment of a fuzzy control method according to the present invention will be described in the following.

A feature of the present invention is that a condition part of a control rule includes proposition with respect to an indefinite time characterized by a membership function whose variable is a time. Hereinafter, the membership function whose variable is a time is termed a fuzzy temporal quantifier.

Figure 1:
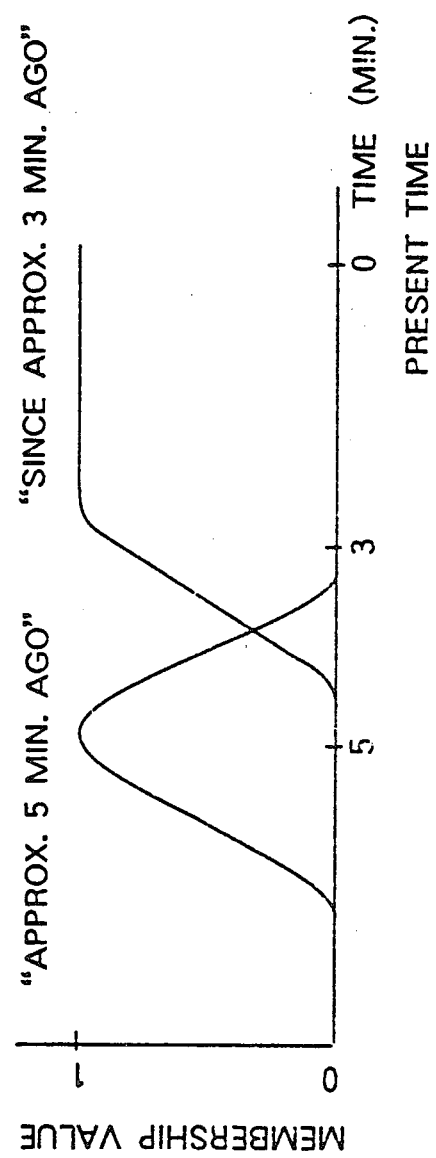
FIG. 1 is a schematic showing an example of a membership function which represents a fuzzy temporal quantifier applied in a fuzzy control method as an embodiment of the present invention.

FIG. 1 is a schematic showing an example of the fuzzy temporal quantifier.

As shown in FIG. 1, for example, in the case of a control rule "if the pressure was high approx. 5 minutes ago, slightly open the valve", the proposition with respect to the indefinite time of "approx. 5 minutes ago" can be expressed by using a fuzzy temporal quantifier. In addition, in this example, the portion of "the pressure was high" is also a fuzzy proposition with respect to the state of the controlled object. Likewise, in the case of a control rule "if the pressure has been high since approx. 3 minutes ago, slightly open the valve", the proposition with respect to an indefinite elapsed time of "since approx. 3 minutes ago" can be expressed by using the fuzzy temporal quantifier.

Figure 2:
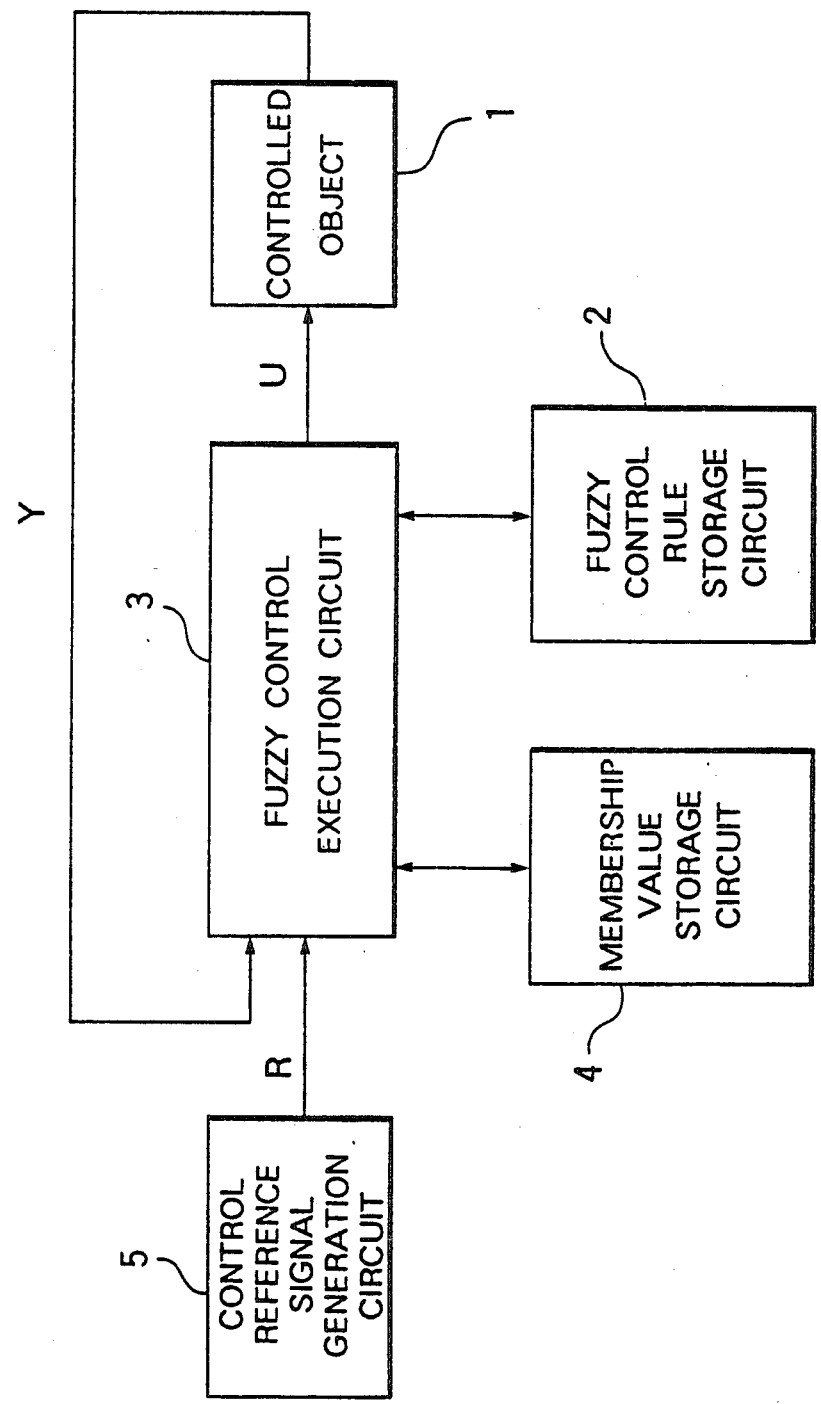
FIG. 2 is a block diagram describing the structure of a control system using the fuzzy control method embodying the present invention.

FIG. 2 is a block diagram showing the structure of a control system using the fuzzy control method of the present embodiment.

In the figure, the numeral 1 is a controlled object such as a plant or a robot; the numeral 2 is a fuzzy control rule storage circuit for storing a control rule; the numeral 3 is a fuzzy control execution circuit for executing the fuzzy control of the controlled object 1; the numeral 4 is a membership value storage circuit for storing the degree of confidence of the fuzzy proposition with respect to the state of the controlled object 1 as a membership value, the degree of confidence being calculated for the entire control rule; and the numeral 5 is a control reference signal generation circuit for generating a signal representing a control reference value, the signal being output to the fuzzy control execution circuit 3.

Then, the flow of the fuzzy control in the control system will be described in the following.

Figure 3:
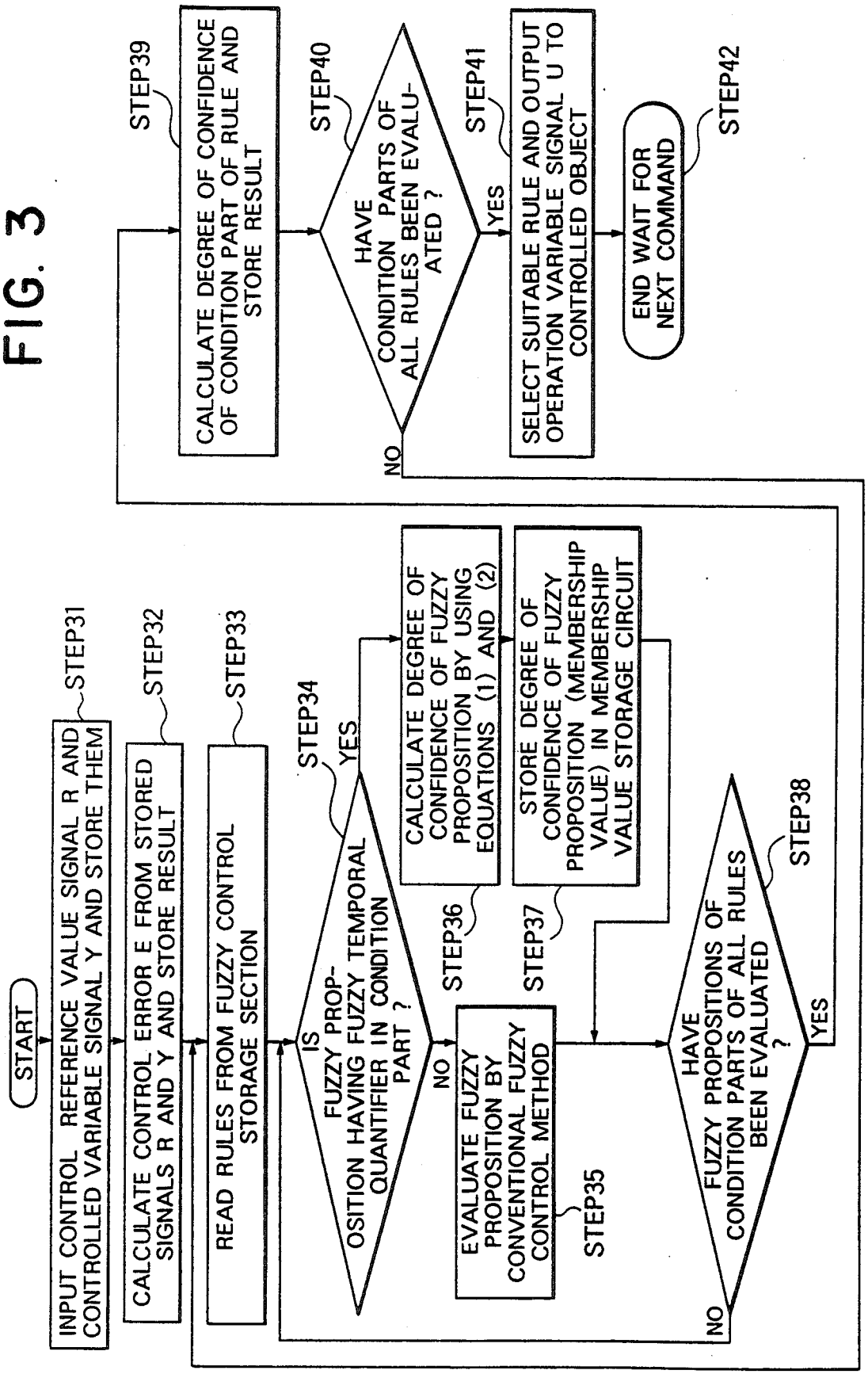
FIG. 3 is a flow chart showing a fuzzy control process in the control system shown in FIG. 2.

FIG. 3 is a flow chart showing the flow of the fuzzy control.

A control amount signal Y, which is a state measurement value of the controlled object 1 at each predetermined sampling time, and a control reference value signal R, which is a reference state value of the controlled object 1 are input to and temporarily stored in the fuzzy control execution circuit 3 (in step 31).

Then, the fuzzy control execution circuit 3 subtracts the controlled variable signal Y from the control reference value signal R to obtain a control error E, which it stores (in step 32).

The fuzzy control execution circuit 3 reads all control rules from the fuzzy control rule storage circuit 2 (in step 33).

The control rules partially contain fuzzy propositions expressed by using fuzzy temporal quantifiers in their condition parts. The fuzzy control execution circuit 3 determines whether or not each control rule has a fuzzy temporal quantifier (in step 34). For control rules which do not have a fuzzy temporal quantifier, the fuzzy control execution circuit 3 evaluates the fuzzy propositions according to the calculations of the membership values based on the conventional fuzzy control method and stores the results (in step 35). For the control rules which have a fuzzy temporal quantifier, the fuzzy control execution circuit 3 evaluates the fuzzy propositions according to the following method.

The signals U, Y, R, and E at time t are expressed by the following vectors. For the operation variable signal U, $$U(t) = (u_1(t), u_2(t), \ldots, u_m(t)$$

For the controlled variable signal Y,
$$Y(t) = (y_1(t), y_2(t), \ldots, y_i(t), \ldots, y_n(t))$$

For the control reference value signal R,
$$R(t) = (r_1(t), r_2(t), \ldots, r_i(t), \ldots, r_n(t))$$

For the control error E,
$$E(t) = (e_1(t), e_2(t), \ldots e_i(t), \ldots, e_n(t))$$

where $e_i(t) = r_i(t) - y_i(t)$

A control rule which has a fuzzy temporal quantifier can be expressed as follows.

$$IF(T(e_i = A)) \text{ and } (e_j = B), \text{ then } (u_k = C)$$

where A, B, and C are fuzzy values. These fuzzy values are characterized by membership functions $f_A$, $f_B$, and $f_C$, respectively. T is a fuzzy temporal quantifier, which is characterized by a membership function $f_T$.

If $e_i(t)$ and $e_j(t)$ are observed as the control error E at the present time t, the degree of confidence g $(T(e_i = A))$ of the fuzzy proposition of the condition part which has the fuzzy temporal quantifier T can be obtained by using the following equations.

Figure 4:
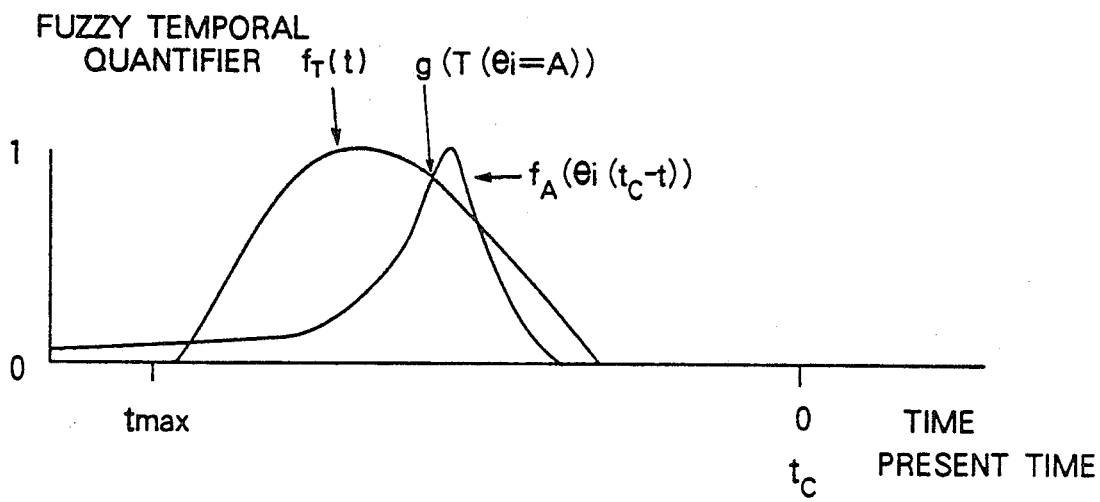
FIG. 4 is a schematic illustrating an equation for obtaining the degree of confidence of a fuzzy proposition with respect to the state of the controlled object at an indefinite time in the fuzzy control shown in FIG. 3.

(1) When the fuzzy temporal quantifier T relates to an indefinite time such as "approx. 5 minutes ago", as shown in FIG. 4, the degree of confidence g $(T(e = A))$ of the fuzzy proposition can be obtained by the following equation.

$$\max(\min(f_T(t), f_A(e_i(t_c - t))))$$
$$t = 0, t \text{ max} \quad (1)$$

where t max is the upper limit of the evaluation range of the fuzzy temporal quantifier T when the present time is origin 0.

Figure 5:
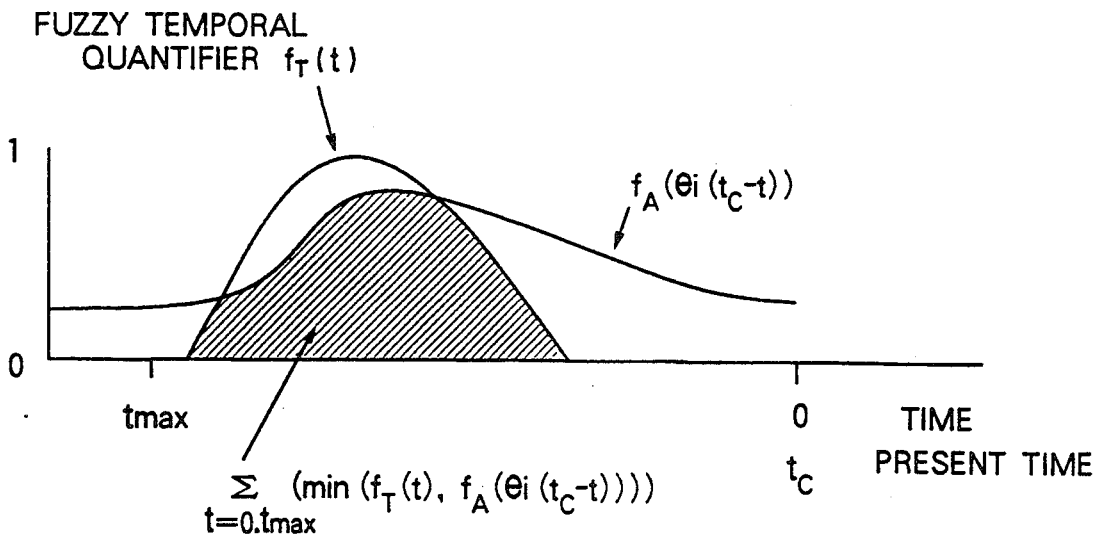
FIG. 5 is a schematic illustrating the equation for obtaining the degree of confidence of the fuzzy proposition with respect to the state of the controlled object in an indefinite elapsed time in the fuzzy control shown in FIG. 3.

(2) When the fuzzy temporal quantifier T relates to an indefinite elapsed time such as "since approx. 3 minutes ago", as shown in FIG. 5, the degree of confidence g $(T(e_i = A))$ of the fuzzy proposition can be expressed by the following equation.

$$\sum_{t=0, t \text{ max}} (\min(f_T(t), f_A(e_i(t_c - t)))) / \sum_{t=0, t \text{ max}} f_T(t) \quad (2)$$

The fuzzy control execution circuit 3 calculates the degree of confidence of the fuzzy proposition which has the fuzzy temporal quantifier T by using the equations (1) and (2) (in step 36).

After that, the fuzzy control execution circuit 3 stores the calculated degree of confidence of the fuzzy proposition as a membership value in the membership value storage circuit 4 (in step 37).

The fuzzy control execution circuit 3 determines whether or not the fuzzy propositions of all the control rules have been evaluated (in step 38). When the determined condition is "YES", the fuzzy control execution circuit 3 calculates the degree of confidence of the satisfaction of the condition part of each control rule and stores it (in step 39).

After that, the fuzzy control execution circuit 3 determines whether or not the degrees of confidence of the condition parts of all the control rules have been calculated (in step 40). When the determined condition is "YES", the fuzzy control execution circuit 3 obtains a suitable control rule according to the degree of confidence of each condition part.

Then, the fuzzy control execution circuit 3 outputs the control amount signal U to the controlled object 1 in accordance with the "then" part of the control rule (in step 41).

After that, the flow enters the wait state until the subsequent sampling time takes place (in step 42).

Thus, according to the present embodiment, the states of the controlled object 1 with respect to indefinite times and indefinite elapsed times can be evaluated. Consequently, the fuzzy control which satisfactorily accords to the knowledge of an experienced operator can be accomplished.

In the fuzzy control method according to the aforementioned embodiment, the control reference value signal R and controlled variable signal Y were input in the fuzzy control execution circuit 3. However, the present invention is not limited to that. The inputs in the fuzzy control can be replaced with various substitutes as long as they relate to the states of the controlled object 1 depending on the structure of the control rules.

For example, only information of a reference state at a particular time of the controlled object 1 can be input to the fuzzy control execution circuit 3. In addition, it is also possible to input only information with respect to the process states of the controlled object 1, the information being determined by the operator.

What is claimed is:

1. A fuzzy control method for controlling an object in accordance with control rules, the control rules having condition parts and action parts, each condition part having a fuzzy proposition representing an indefinite state of the object at an indefinite time, said method comprising the steps of:
   generating state measurement values of the object;
   calculating a degree of confidence of the fuzzy proposition of the condition part of each control rule in accordance with the state measurement values;
   calculating a degree of confidence of the satisfaction of the condition part of each control rule by using the degree of confidence of each said fuzzy proposition;

selecting one of the control rules according to the degree of confidence of the satisfaction of each condition part; and controlling the object according to the action part of the selected control rule.

2. The fuzzy control method according to claim 1, further comprising the step of:

generating reference state values of said object, and wherein said step of calculating a degree of confidence of the fuzzy proposition comprises the step of subtracting the state measurement values from the reference state values.

3. A fuzzy control method for controlling an object in accordance with control rules, the control rules having condition parts and action parts, each condition part having a fuzzy proposition representing an indefinite state of the object at an indefinite time, said method comprising the steps of:

generating state measurement values at predetermined sampling times;

generating reference state values for the object;

subtracting the state measurement values from the reference state values thereby obtaining control error values;

calculating a degree of confidence of the fuzzy proposition of the condition part of each control rule in accordance with the control error values;

calculating a degree of confidence of the satisfaction of the condition part of each control rule according to the degree of confidence of each said fuzzy proposition;

selecting a control rule according to the degree of confidence of the satisfaction of each said condition part; and controlling the object according to the action part of the selected control rule.

4. The fuzzy control method according to any one of claims 1 to 3, wherein:

each said fuzzy proposition is represented by a membership function having an indefinite time as a variable.

5. The fuzzy control method according to any one of claims 1 to 3, wherein:

each said fuzzy proposition is represented by a membership function having an indefinite elapsed time as a variable.

6. A fuzzy control apparatus comprising:

an input for receiving a controlled variable signal from an object, said controlled variable signal being sampled at a predetermined sampling times;

a control reference value signal generating circuit for generating a control reference value signal;

a storage circuit for storing a plurality of fuzzy control rules having condition parts and action parts, wherein each condition part includes a fuzzy proposition, the condition part of at least one fuzzy control rule including a fuzzy proposition which represents the object in terms of an indefinite time and an indefinite state;

a fuzzy control execution circuit, coupled to said input, said control reference value signal generating circuit, and said storage circuit comprising:

means for determining a control error between the controlled variable signal and the control reference value signal;

means for determining a degree of confidence of the fuzzy proposition of the condition part of said at least one fuzzy control rule using a predetermined function and the control error;

means for evaluating the fuzzy propositions of the condition parts of the remaining fuzzy control rules;

means for determining a degree of confidence of a satisfaction of the condition part of each fuzzy control rule on the basis of the determined degree of confidence of the condition parts of said at least one fuzzy control rule and the evaluated fuzzy propositions of the condition parts of the remaining fuzzy control rules; and means for selecting one of the fuzzy control rules on the basis of the degrees of confidence of the satisfaction of the condition parts; and means for outputting an operation variable to control the object based upon the action part of the selected fuzzy control rule.

7. The fuzzy control apparatus of claim 6, wherein the indefinite time is represented by the indefinite time t and wherein the means for determining a degree of confidence of the fuzzy proposition of the condition part of said at least one fuzzy control rule uses the following predetermined function:

$$\max(\min(f_T(t), f_A(e_i(t_c - t))))$$

$$t = 0, t_{max}$$

wherein $f_T$ is a membership function having time as a variable; $f_A$ is a membership function having a state of the object as a variable; $t_{max}$ is the upper limit of an evaluation range of a fuzzy temporal quantifier T when present time is 0; $e_i$ is a control error at the present time; and $t_c$ is the present time.

8. The fuzzy control apparatus of claim 6, wherein when the indefinite time is represented by an indefinite elapsed time t and wherein the means for determining a degree of confidence of the fuzzy proposition of the condition part of said at least one fuzzy control rule uses the following predetermined function;

$$\sum_{t=0, t_{max}} (\min(f_T(t), f_A(e_i(t_c - t)))) / \sum_{t=0, t_{max}} f_T(t)$$

wherein $f_T$ is a membership function having time as a variable; $f_A$ is a membership function having a state of the object as a variable; $t_{max}$ is the upper limit of an evaluation range of a fuzzy temporal quantifier T when present time is 0; $e_i$ is a control error at the present time; and $t_c$ is the present time.

* * * * *